(12) United States Patent
Ploeger et al.

(10) Patent No.: US 10,060,348 B2
(45) Date of Patent: Aug. 28, 2018

(54) MEMBRANE SEPARATION OF CARBON DIOXIDE FROM NATURAL GAS WITH ENERGY RECOVERY

(71) Applicant: AIR PRODUCTS AND CHEMICALS, INC., Allentown, PA (US)

(72) Inventors: Jason Michael Ploeger, Perkasie, PA (US); John Eugene Palamara, Macungie, PA (US); Jack Theodore Kindt, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 492 days.

(21) Appl. No.: 14/496,240

(22) Filed: Sep. 25, 2014

(65) Prior Publication Data

US 2016/0090910 A1 Mar. 31, 2016

(51) Int. Cl.

| F02C 3/22 | (2006.01) |
|---|---|
| F02C 9/40 | (2006.01) |
| F23R 3/36 | (2006.01) |
| B01D 53/22 | (2006.01) |
| F02C 9/28 | (2006.01) |
| C10L 3/10 | (2006.01) |

(52) U.S. Cl.
CPC ............ *F02C 3/22* (2013.01); *B01D 53/22* (2013.01); *B01D 53/229* (2013.01); *C10L 3/104* (2013.01); *F02C 9/28* (2013.01); *F02C 9/40* (2013.01); *F23R 3/36* (2013.01); *B01D 2053/221* (2013.01); *B01D 2256/245* (2013.01); *B01D 2257/504* (2013.01); *Y02C 10/04* (2013.01); *Y02C 10/10* (2013.01); *Y02E 20/16* (2013.01)

(58) Field of Classification Search
CPC ...... F02C 3/22; F02C 3/20; F02C 7/22; F02C 9/28; F02C 9/40; F02C 9/263; B01D 53/228; B01D 53/22; B01D 53/46; B01D 53/62; B01D 2251/208; B01D 2256/245; B01D 2257/7025; C10L 3/06; C10L 3/10; C10L 3/101; C10L 3/104; F23R 3/36
See application file for complete search history.

(56) References Cited

U.S. PATENT DOCUMENTS

| 4,963,165 A | 10/1990 | Blume et al. |
| 5,558,698 A | 9/1996 | Baker et al. |

(Continued)

FOREIGN PATENT DOCUMENTS

| CN | 102635415 | | 8/2012 |
| DE | 102010050214 | A1 | 5/2012 |
| WO | 2010006910 | A1 | 1/2010 |

OTHER PUBLICATIONS

Scholes, Colin A., "Membrane Gas Separation Applications in Natural Gas Processing", Fuel, vol. 96, 2012; pp. 15-28.

*Primary Examiner* — Andrew Nguyen
(74) *Attorney, Agent, or Firm* — Amy Carr-Trexler

(57) ABSTRACT

Carbon dioxide is separated from natural gas using a single stage membrane separation system to produce a retentate gas that typically meets the specification for pipeline distribution of natural gas, and a permeate gas comprising methane that is combusted to generate power and/or heat, e.g. for use in providing the utility requirements of the process itself or for export to an integrated process. Advantages include an overall reduction in power consumption and improvement in process efficiency.

18 Claims, 7 Drawing Sheets

(56) References Cited

U.S. PATENT DOCUMENTS

| | | | | |
|---|---|---|---|---|
| 6,035,641 | A * | 3/2000 | Lokhandwala | B01D 53/002 60/649 |
| 6,572,678 | B1 * | 6/2003 | Wijmans | B01D 53/226 95/47 |
| 7,429,287 | B2 | 9/2008 | Frantz | |
| 8,984,857 | B2 * | 3/2015 | Minta | F01K 23/068 166/402 |
| 2010/0162678 | A1 * | 7/2010 | Annigeri | F02C 3/22 60/39.281 |
| 2011/0023717 | A1 * | 2/2011 | Itami | B01D 53/228 96/11 |
| 2013/0131199 | A1 * | 5/2013 | Lien | B01D 53/22 518/702 |
| 2014/0107388 | A1 * | 4/2014 | Lokhandwala | B01D 53/228 585/818 |
| 2015/0013377 | A1 * | 1/2015 | Oelfke | B01D 3/36 62/602 |

* cited by examiner

MEMBRANE SEPARATION OF CARBON DIOXIDE FROM NATURAL GAS WITH ENERGY RECOVERY

BACKGROUND OF THE INVENTION

The present invention relates to a process for separating carbon dioxide from natural gas using membranes, e.g. semi-permeable membranes. Separating acid gases from untreated natural gas may be referred to as "sweetening" the natural gas. Examples of acid gases that are typically found in untreated natural gas include carbon dioxide ($CO_2$) and hydrogen disulfide ($H_2S$), and untreated natural gas containing one or more of these gases may be referred to as a "sour" gas. The present invention may therefore comprise at least a part of a "sweetening" process for an untreated or "sour" natural gas. The process is intended to enable the production of natural gas of pipeline quality for distribution and use by consumers.

Natural gas deposits containing more than 3% carbon dioxide, and often more than 1.5% carbon dioxide, must be treated to reduce the carbon dioxide content prior to distribution via pipelines. The most common treatment method is chemical absorption within a solvent, which is a solvent wash process typically using an aqueous amine solution such as monoethanolamine (MEA). In such a process, a carbon dioxide-lean amine solution absorbs carbon dioxide from the natural gas to produce a carbon dioxide-enriched solvent which is separated from the natural gas. The solvent is regenerated by applying heat which strips the carbon dioxide from the amine solution. The carbon dioxide is then typically vented to the atmosphere. However, amine absorption systems consume large amounts of energy for solvent regeneration and require significant hazardous chemical inventory.

Membrane treatment is an alternative technology that can offer simpler operation and higher efficiency. Unfortunately, more than one membrane stage is usually required to achieve high natural gas recovery. Typically, the membrane is preferentially permeable to carbon dioxide over methane, but the selectivity is not so high to prevent a significant fraction of the methane to slip into the permeate. This methane slip can be mitigated by the addition of at least one further membrane stage to recover and recycle methane from the permeate, at the cost of additional membranes and power consumption for recompression. Thus, membrane systems typically require carbon dioxide concentrations above about 10% to be economically competitive with treatment processes involving amine absorption.

Scholes et al (Fuel; vol. 96; pp 15-28; 2012) provide a convenient summary of current membrane technology. They describe the physical parameters and performance characteristics of three classes of polymeric membranes, viz. cellulose acetate, polyimides, and perfluoropolymers. Typical $CO_2/CH_4$ selectivities range from 4 to 100, although in practice the selectivity can be changed significantly by the nature and amount of the impurities in the natural gas, and temperature.

There are many examples in the art of the use of membranes to remove carbon dioxide from natural gas. For example, Frantz (U.S. Pat. No. 7,429,287A) teaches a multiple stage carbon dioxide removal membrane system that combusts a permeate having a low heating value to generate power.

Baker et al (U.S. Pat. No. 5,558,698A) teaches a membrane system involving one or more stages to remove carbon dioxide and hydrogen sulfide from natural gas that minimizes the concentration of methane in the permeate.

Lokhandwala (U.S. Pat. No. 6,035,641A) teaches of a one stage membrane system that is selective for methane over nitrogen and is used to upgrade a gas stream having a low heating value. The permeate is enriched in methane and used to generate power.

Membranes have also been used to remove carbon dioxide from biogas. For example, Biehl et al (WO2010/006910A) teaches a one stage membrane system that removes carbon dioxide from a biogas feed having a low heating value and containing at least 18 vol. % carbon dioxide with the remainder consisting essentially of methane, water vapor and nitrogen. The system generates as retentate a natural gas stream for distribution that contains preferably less than 15 vol. %, carbon dioxide, together with a permeate stream containing preferably at least 8 vol. %, methane for use in an afterburner in a cogeneration plant.

BRIEF SUMMARY OF THE INVENTION

According to a first aspect of the present invention, there is provided a process for separating carbon dioxide from natural gas, said process comprising: introducing natural gas feed comprising carbon dioxide (e.g. "sour" or "untreated" natural gas) to a single stage membrane separation system for separation of carbon dioxide from the natural gas feed to produce methane-enriched retentate gas (e.g. "sweetened" or "treated" natural gas) and carbon dioxide-enriched permeate gas comprising methane;

combusting at least a portion of said permeate gas to generate combustion exhaust gas; and recovering energy from said combustion, e.g. for use within the process and/or within an integrated process.

The present invention enables the design of a membrane system with a single stage and high methane slip by recovering at least a portion of the energy in the permeate gas via combustion in, for example, a gas turbine, boiler or a reciprocating engine to generate low cost power and/or heat to produce steam or hot oil.

One advantage of the invention is the elimination of the need to further treat the permeate gas. The skilled practitioner would appreciate that the typical optimization strategy for treating natural gas using membranes is to repressurize the permeate gas and feed it to a second stage membrane separation system. The invention changes the optimization strategy by deliberately allowing significant methane slip to provide a permeate gas with a sufficiently high heating value to generate power and/or heat by combustion which can then be used to produce steam or hot oil. The new arrangements reduce or eliminate the need for interstage compression, thereby reducing total power consumption and overall capital and operational costs. The process generates power and/or heat which can be used internally or exported to an integrated process to further reduce total power consumption and improve overall efficiency.

Another advantage of the invention is that, by reducing the amount and size of the required equipment, a wider range of carbon dioxide concentrations can be treated.

In a preferred arrangement of the first aspect, there is provided a process for separating carbon dioxide from natural gas feed taken from an underground deposit in a geological formation, said natural gas feed comprising at least about 80% methane and from about 3% to about 15% carbon dioxide and having a higher heating value of at least about 780 BTU/scf (31 $MJ/Nm^3$), said process comprising:

introducing said natural gas feed to a single stage membrane separation system comprising at least one polymeric membrane unit in which the membrane(s) has a $CO_2/CH_4$ selectivity of from about 10 to about 50, said natural gas feed being fed to said system at a pressure from about 275 psi (19 bar) to about 1200 psi (85 bar) and a temperature from about 40° C. to about 80° C. for separation of carbon dioxide from said natural gas feed to produce methane-enriched retentate gas for pipeline distribution and carbon dioxide-enriched permeate gas comprising at least about 40% methane and from about 10% to about 50% carbon dioxide and having a higher heating value from about 400 BTU/scf (15 MJ/Nm$^3$) to about 800 BTU/scf (32 MJ/Nm$^3$);
combusting at least a portion of said permeate gas to generate combustion exhaust gas; and
recovering energy from said combustion, e.g. as power and/or heat from at least a portion of said combustion exhaust gas.

According to a second arrangement of the first aspect of the present invention, there is provided a process for separating carbon dioxide from natural gas, said process comprising:
introducing natural gas feed comprising carbon dioxide to a single stage membrane separation system for separation of carbon dioxide from said natural gas feed to produce methane-enriched retentate gas and carbon dioxide-enriched permeate gas comprising methane;
combusting at least a portion of said permeate gas to generate a combustion exhaust gas; and
recovering energy as power from said combustion, e.g. from at least a portion of said combustion exhaust gas and optionally from turbine exhaust gas produced therefrom, wherein at least a portion of said power is used to provide compression duty.

According to a third arrangement of the first aspect of the present invention, there is provided a process for separating carbon dioxide from natural gas, said process comprising:
introducing natural gas feed comprising carbon dioxide to a solvent absorption system comprising a carbon dioxide absorption stage and a solvent re-generation stage, to produce carbon dioxide and carbon dioxide-depleted natural gas;
introducing natural gas feed comprising carbon dioxide to a single stage membrane separation system for separation of carbon dioxide from said natural gas feed to produce methane-enriched retentate gas and carbon dioxide-enriched permeate gas comprising methane;
combusting at least a portion of said permeate gas to generate a combustion exhaust gas; and
recovering energy as heat from said combustion, e.g. from at least a portion of said combustion exhaust gas, wherein at least a portion of said heat recovered from said combustion is used to provide utility heating duty in said solvent regeneration stage of said solvent absorption system.

The natural gas feeds to the solvent absorption system and the membrane separation system may come from different sources. However, in preferred embodiments, the feeds come from the same source and the solvent absorption system and the membrane separation system operate in parallel to remove carbon dioxide from the natural gas.

Energy may also be recovered as power from the combustion exhaust gas and a portion of the power recovered may be used to provide compression duty for the feed to the solvent absorption system.

According to a second aspect of the present invention, there is provided apparatus for separating carbon dioxide from natural gas, said apparatus comprising:

at least one wellhead in fluid flow communication with an underground natural gas deposit in a geological formation;
a single stage membrane separation system in fluid flow communication with said wellhead(s), said system comprising at least one polymeric membrane unit in which each membrane comprises a retentate side and a permeate side and has a $CO_2/CH_4$ selectivity of at least about 5;
a combustion system in fluid flow communication with said permeate side of said membrane(s); and
an energy recovery system in combination with said combustion system.

In another arrangement of the second aspect of the present invention, there is provided apparatus for separating carbon dioxide from natural gas, said apparatus comprising:
at least one compression system;
a single stage membrane separation system comprising at least one polymeric membrane unit in which each membrane comprises a retentate side and a permeate side, and has a $CO_2/CH_4$ selectivity of at least about 5;
a combustion system in fluid flow communication with said permeate side of said membrane(s); and
an energy recovery system in combination with said combustion system;
wherein said compression system or, where there is more than one, at least one compression system is powered by said energy recovery system.

The compression system(s) in this arrangement (or, indeed, in any of the arrangements or embodiments of the apparatus disclosed herein) may be powered or driven directly by at least one turbine or reciprocating engine. In such embodiments, the compression system(s) may be coupled mechanically to the turbine(s) or engine(s), e.g. by a drive shaft, optionally using gears. Alternatively, the compression system(s) may be powered or driven indirectly by the turbine(s) or engine(s). In these embodiments, the turbine(s) or engine(s) may drive an electricity generator which may then be used to power an electric motor in the compression system.

In a further arrangement of the second aspect of the present invention, there is provided apparatus for separating carbon dioxide from natural gas, said apparatus comprising:
a source of natural gas feed;
a carbon dioxide removal system in fluid flow communication with said source of natural gas, said carbon dioxide removal system comprising in parallel;
a solvent absorption system comprising a carbon dioxide absorption stage and a solvent re-generation stage; and
a single stage membrane separation system comprising at least one polymeric membrane unit in which each membrane comprises a retentate side and a permeate side and has a $CO_2/CH_4$ selectivity of at least about 5;
a combustion system in fluid flow communication with said permeate side of said membrane(s); and
an energy recovery system in combination with said combustion system, said energy recovery system comprising a heat transfer system integrated between said combustion system and said solvent re-generation stage of said solvent absorption system.

For each arrangement of the apparatus, the membrane(s) of the membrane separation system may have a $CO_2/CH_4$ selectivity from about 10 to about 50.

DETAILED DESCRIPTION OF THE INVENTION

Figure 1:
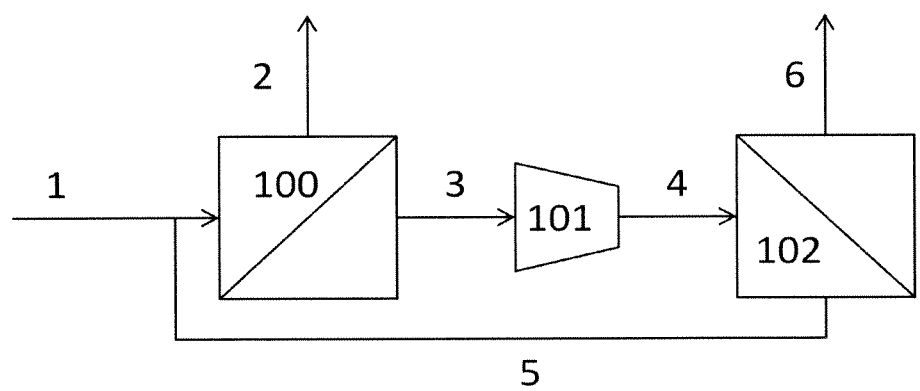
FIG. 1 depicts a prior art flow sheet for removing carbon dioxide from natural gas using a two stage membrane system.

All references herein to pressure are references to absolute pressure and not gauge pressure unless expressly stated otherwise. In addition, references to the singular should be interpreted as including the plural and vice versa, unless it is clear from the context that only the singular or plural is meant. Further, unless expressly stated otherwise, fluid compositions are calculated in mol. % on a "dry" basis, i.e. excluding any water content from the calculations.

Overview of the Process

The process according to the present invention involves introducing natural gas feed containing carbon dioxide to a single stage membrane separation system for separation of carbon dioxide from said natural gas feed to produce methane-enriched retentate gas and carbon dioxide-enriched permeate gas comprising methane. At least a portion of the permeate gas is combusted to generate combustion exhaust gas. Energy, typically in the form of power and/or heat, is recovered from the combustion, e.g. from at least a portion of the combustion exhaust gas.

The following terms used in the specification are defined as follows:

The term "semi-permeable membrane" refers to a membrane that has a higher rate of permeation for some gases relative to other gases. In the case of the present invention, the membrane is selective for carbon dioxide over methane, i.e. preferentially allows carbon dioxide to pass through the membrane relative to methane. References to "membrane" are to be interpreted as references to "semi-permeable membrane", unless it is clear from the context that a different type of membrane is intended.

The term "permeate gas" refers to the gas that passes through the semi-permeable membrane.

The term "retentate gas" refers to the gas that does not pass through the semi-permeable membrane.

The term "natural gas feed" refers to a natural gas that requires removal of at least carbon dioxide in order to meet regulatory specifications for pipeline distribution. Typically, natural gas feed comprising more than 1.5% by volume, e.g. more than 2% by volume or more than 3% by volume, carbon dioxide.

The term "pipeline quality natural gas" refers to natural gas that meets regulatory specifications for pipeline distribution. The present invention focuses on the carbon dioxide specification, which is typically no more than 3% by volume, e.g. no more than 2% by volume or even no more than 1.5% by volume.

The term "methane slip" refer to the loss of methane through the membrane into the permeate.

The term "$CO_2/CH_4$ selectivity" refers to the ratio of permeabilities of carbon dioxide over methane across the membrane.

The term "methane recovery" refers to the flow rate of methane in the retentate gas divided by the flow rate of methane in the natural gas feed to the membrane separation system.

The term "heating value" or "HV" refers to the amount of heat released during the combustion of a specified amount of a substance. The term "higher heating value" or "HHV" takes into account the latent heat of vaporization of water in the combustion products, i.e. assumes that all of the water component is in the liquid state after combustion. Heating value may be measured in "BTU/scf" which are British Thermal Units per standard cubic foot, i.e. at 60° F. (15.6° C.) and 1 atm (1.01 bar). The equivalent metric units used in the specification are "$MJ/Nm^3$", or mega joules per normal meter cubed, i.e. at 32° F. (0° C.) and 1 atm (1.01 bar).

Energy may used in the form in which it is recovered, or recovered in one form and converted to another form prior to use. For example, energy may be recovered as heat or power which exported directly for use elsewhere. Alternatively, energy may be recovered and used to drive a electricity generator where it is converted into electrical energy.

Composition of the "Natural Gas Feed"

Natural gas is produced by thermogenic decomposition organic matter exposed to heat and pressure under the earth's crust for millions of years. Natural gas typically comprises methane as the primary component, with smaller amounts of ethane, propane and butane, as well as nitrogen, carbon dioxide and traces of other gases. The individual proportions of the components can vary depending on the origin of the natural gas although many natural gas deposits comprise:

| | |
|---|---|
| Methane | 70 to 90%; |
| $C_2$-$C_4$ hydrocarbons | 0 to 20%; |
| Carbon dioxide | 0 to 8%; |
| Oxygen | 0 to 0.2%; |
| Nitrogen | 0 to 5%; |
| Hydrogen sulfide | 0 to 5%; and |
| Rare gases | trace. |

(source: www.naturalgas.org)

The term "natural gas" refers to methane-containing gas mixtures taken from an underground deposit in a geological location, and includes associated and non-associated natural gas, and shale gas. In the context of the present invention, the term does not include "biogas" which is a methane-containing gas mixture that is produced naturally from decaying organic matter by methanogenic bacteria. Such gas is usually found on or very near to the surface of the earth and is released typically into the atmosphere although may be collected and processed (see WO2010/006910A).

Natural gas suitable as feed for the present invention has a higher heating value of at least about 780 BTU/scf (31 $MJ/Nm^3$), preferably from about 810 BTU/scf (32 $MJ/Nm^3$) to about 960 BTU/scf (38 $MJ/Nm^3$), and more preferably from about 860 BTU/scf (34 $MJ/Nm^3$) to about 960 BTU/scf (39 $MJ/Nm^3$).

The process according to the present invention has particular application in the processing of natural gas comprising more than 75%, preferably at least about 80%, and more preferably at least about 85% methane. The natural gas usually comprises no more than about 98.5%, and preferably no more than about 97% methane.

The untreated natural gas feed typically comprises one or more $C_{2+}$ hydrocarbons, including $C_2$ to $C_4$ hydrocarbons, such as ethane, propane and butane in particular. The total amount of said $C_{2+}$ hydrocarbons in the natural gas feed is usually in the range from 0.1% to about 20%.

The natural gas feed typically comprises less than 18%, preferably no more than 15%, and more preferably no more than 10% carbon dioxide. The natural gas feed usually comprises more than about 1.5%, and typically more than 3% carbon dioxide.

The natural gas is usually fed to the single stage membrane separation system at a pressure of at least about 275 psi (19 bar), and preferably from about 600 psi (40 bar) to about 1200 psi (85 bar).

The natural gas is usually fed to said single stage membrane separation system at a temperature from about −10° C. to about 80° C. The optimum feed temperature depends on the identity of the polymeric membrane. However, the feed temperature is preferably from about 40° C. to about 80° C. This range is particularly suitable for polyimide membranes (see below).

The temperature of the natural gas may need to be adjusted prior to being fed to the single stage membrane separation system. In this regard, the natural gas may be warmed or cooled as required by indirect heat exchange prior to being fed to the single stage membrane separation system.

Single Stage Membrane Separation System

The single stage membrane separation system either comprises a single polymeric membrane unit or a plurality of such units in series. In the latter embodiments, the retentate gas from one unit is fed to an adjacent downstream unit without recompression. Where there is more than one unit, the units are preferably identical although different units may be used as required.

The single stage membrane separation system typically comprises no more than ten, e.g. up to six, polymeric membrane units in series although, in some preferred embodiments, the membrane system comprises from two to four, e.g. three, polymeric membrane units in series.

The single stage membrane separation system usually comprises at least one polymeric membrane unit in which the membrane(s) has a $CO_2/CH_4$ selectivity of at least 5, and preferably at least 10. The $CO_2/CH_4$ selectivity is typically no more than 100, and preferably no more than 50. Particularly suitable polymeric membranes have a $CO_2/CH_4$ selectivity from about 10 to about 50.

The single stage membrane separation system usually comprises at least one polymeric membrane unit comprising polymeric membranes selected from the group consisting of cellulose acetate membranes, polyimide membranes and perfluoropolymer membranes. However, polyimide membranes are preferred.

It is well within the ability of the skilled person to size the or each membrane unit appropriately on the basis of the requirements of any given process. In this regard, the skilled person would be aware that, as the surface area of the unit increases, more carbon dioxide is removed and more methane slips into the permeate. Costs are balanced between the size of the membranes and the extent of feed compression.

Permeate Gas

The heating value of the permeate gas is typically sufficient to support combustion without adding another fuel. In preferred embodiments, the permeate gas has a higher heating value of at least about 400 BTU/scf (15 MJ/Nm$^3$), preferably at least about 500 BTU/scf (19 MJ/scf), and more preferably at least about 600 BTU/scf (23 MJ/Nm$^3$). Typically, the permeate gas has a higher heating value of no more than about 800 BTU/scf (32 MJ/Nm$^3$), and preferably no more than about 700 BTU/scf (28 MJ/Nm$^3$). In some preferred embodiments, the permeate gas has a higher heating value in the range from about 500 BTU/scf (19 MJ/scf) to about 800 BTU/scf (32 MJ/Nm$^3$), e.g. in the range from about 600 BTU/scf (23 MJ/Nm$^3$) to about 700 BTU/scf (28 MJ/Nm$^3$).

The permeate gas typically comprises at least about 40%, preferably at least about 50%, and more preferably at least about 60%, methane. The permeate gas usually comprises no more than about 89%, preferably no more than about 80%, and more preferably no more than about 70%, methane. In some preferred embodiments, the permeate gas comprises from about 50% to about 80% methane.

The permeate gas typically comprises at least about 10%, and preferably at least about 30%, carbon dioxide. The permeate gas usually comprises no more than about 50% carbon dioxide.

The pressure of the permeate gas is typically from about 15 psi (1 bar) to about 200 psi (14 bar). Where the permeate gas feeds a gas turbine or reciprocating engine, it may be more efficient to run the feed at a higher pressure, allowing a higher permeate pressure (to get the same pressure differential across the membrane) and reduce the compression duty required for the feed to the gas turbine. Indeed, it would be possible to run the membrane such that the permeate gas would be at a high enough pressure to feed the gas turbine or reciprocating engine directly, i.e. without the need for compression of the feed to the combustion unit.

Combustion

In some embodiments, the pressure of the permeate gas would sufficient for combustion without recompression. For example, combustion at atmospheric pressure would be acceptable for process fluid heating. However, in embodiments involving a gas turbine, the permeate gas needs to be at an elevated pressure for combustion. Typically, gas turbines run at a pressure in the range of about 100 psi (7 bar) to about 600 psi (41 bar) although most gas turbines run at a pressure within the range of about 150 psi (10 bar) to about 300 psi (21 bar). Where the pressure of the permeate gas is too low to support combustion, the permeate gas is compressed to produce a compressed permeate gas which is then combusted.

Energy may be recovered from the combustion as power and/or heat. In this regard, energy may be recovered as power from the combustion exhaust gas using at least one turbine generating a turbine exhaust gas.

In such embodiments, the permeate gas may be combusted using a gas turbine. Energy may be recovered as heat from the turbine exhaust gas by indirect heat exchange with a heat transfer fluid. For example, the turbine exhaust gas may be used to generate steam in a heat recovery steam generation (HRSG) system. Energy may then be recovered as power from the steam using a steam turbine.

Additionally or alternatively, energy may be recovered as heat from the combustion exhaust gas by indirect heat exchange with a heat transfer fluid.

In such embodiments, the permeate gas may combusted in a heater to heat a heat transfer fluid. Examples include a boiler to generate steam or an oil heater to produce hot oil.

Where the permeate gas is combusted in a boiler to generate stream, energy may be recovered as power from the steam using a steam turbine.

In other embodiments, the permeate gas may be combusted in a reciprocating engine that drives other apparatus.

The permeate gas is preferably the primary (and sole) fuel for combustion. However, the permeate gas may be combusted together with a secondary fuel. The secondary fuel may comprise methane and may be selected from the group consisting of untreated or "raw" natural gas, a portion of the natural gas feed and a portion of the retentate gas.

The higher heating value of the permeate gas being combusted is preferably maintained at a substantially constant level. Natural gas from the untreated feed or the pipeline grade retentate gas may be added to the permeate gas for combustion in order to maintain the higher heating value at the substantially constant level. The amount of the said natural gas added to the permeate gas usually varies in response to changes in flow rate and/or composition of the permeate gas for combustion.

Combustion may be air fired combustion or oxyfuel combustion. Where the combustion is oxyfuel combustion, a flue gas that is produced may be used in enhanced oil recovery (EOR).

Use of Power/Heat

At least a portion of the power recovered in the process may be used to provide compression duty. For example, at least a portion of the power recovered in the process may be used to drive at least one compression system. Suitable examples of compression systems that could be driven by the power recovered in the process include a feed gas compression system, a permeate gas compression system and a refrigerant fluid compression system.

At least a portion of the heat recovered in the process may be used to provide utility heating duty, for example at least a portion of the utility heating duty required by a solvent absorption plant. Where the solvent absorption plant has a natural gas feed, the natural gas for the single stage membrane separation system may be taken from the natural gas feed to the solvent absorption plant.

Where the solvent absorption plant has a feed gas compression system, at least a portion of the power recovered in the process may be used to drive the feed compression system for the solvent absorption plant. Additionally or alternatively, at least a portion of the heat recovered in the process may be used to provide at least a portion of the utility heating duty required for pre-heating said natural gas feed to said single stage membrane separation system.

In particularly preferred embodiments, the process according to the present invention may be operated in parallel with a solvent absorption process to remove carbon dioxide from natural gas feed to produce carbon dioxide-depleted natural gas, e.g. for distribution by pipeline. One application of the present invention would be to retrofit an existing solvent absorption plant with the present process and thereby increase the capacity of the existing plant to process more natural gas. In addition, operation of the two carbon dioxide separation processes in parallel provides another opportunity for optimization to make the overall carbon dioxide removal process more efficient.

Retentate Gas

The retentate gas is intended to meet the specification for pipeline distribution. In this regard, the retentate gas comprises no more than about 3%, and preferably no more than about 2%, carbon dioxide. In addition, the retentate gas typically comprises at least about 90%, and preferably at least about 95% methane. In preferred embodiments, the retentate gas comprises no more than 150 ppmv water and/or no more than 4 ppmv hydrogen sulfide.

Where the natural gas to be processed by the present invention has an excessive amount of hydrogen sulfide, e.g. more than 4 ppmv hydrogen sulfide, the process may comprise removing hydrogen sulfide from the retentate gas or, more typically, from the natural gas prior to feeding the natural gas to the single stage membrane separation system.

The retentate gas usually has a higher heating value from about 950 BTU/scf (37 MJ/Nm$^3$) to about 1100 BTU/scf (44 MJ/Nm$^3$).

Overall methane recovery using the present process is usually less than overall methane recovery achievable using prior art processes having a multiple stage membrane separation system. However, the reduction in overall methane recovery is at least partially offset by the potential reduction in overall power consumption resulting from the utilization of energy recovered from the combustion of the permeate gas and hence the resultant overall increase in thermodynamic efficiency.

The overall methane recovery from the process according to the present invention is typically no more than 95%, and usually no more than 92%. Overall methane recovery is usually in the range from about 60% to about 95%, and preferably from about 88% to 92%.

In a preferred embodiment, the process separates carbon dioxide from natural gas taken from an underground deposit in a geological formation in which the natural gas comprises at least about 80% methane and from about 3% to about 15% carbon dioxide and has a higher heating value of at least about 780 BTU/scf (31 MJ/Nm$^3$). In this embodiment, the process comprises introducing the natural gas feed to a single stage membrane separation system comprising at least one polymeric membrane unit in which the membrane(s) has a $CO_2/CH_4$ selectivity of from about 10 to about 50. The natural gas is fed to the system at a pressure from about 275 psi (19 bar) to about 1200 psi (85 bar) and a temperature from about 40° C. to about 80° C. in order to separate carbon dioxide from the natural gas feed to produce methane-enriched retentate gas for pipeline distribution and carbon dioxide-enriched permeate gas comprising at least about 40% methane and from about 10% to about 50% carbon dioxide and having a higher heating value from about 400 BTU/scf (15 MJ/Nm$^3$) to about 800 BTU/scf (32 MJ/Nm$^3$). At least a portion of the permeate gas is combusted to generate combustion exhaust gas from at least a portion of which energy is recovered as power and/or heat.

The membranes of the present invention may be made from any suitable material such as polymers, metals, ceramics, glasses and carbon. Preferred membranes are polymeric, i.e. made from at least one polymer such as cellulose acetate or perfluorocarbons. Polyimide membranes are particularly preferred.

The membranes may have any suitable geometry including "plate and frame" and "spiral wound" geometries. However, in preferred embodiments, the membranes are in the form of hollow fibres.

The geometry of the membranes preferably provides a surface area per unit volume of more than about 1000 m$^2$/m$^3$, preferably more than about 2500 m$^2$/m$^3$, and most preferably more than about 5000 m$^2$/m$^3$.

A particularly suitable membrane separation unit is commercially available and provided under the trade mark, PRISM®, by Air Products and Chemicals, Inc. of 7201 Hamilton Boulevard, Allentown, Pa. 18195-1501, USA. A PRISM® membrane unit contains thousands of hollow fibre polyimide membranes embedded in a thermoset resin provided within a pressure resistant vessel. The size (or surface area) of the membranes is usually determined on the basis of feed composition, required separation, pressure (up- and downstream) and flowrate. Each fiber may have a diameter of hundreds of microns, and may be from about 1 m to about 4 m in length.

In a first arrangement of the second aspect, the apparatus comprises at least one wellhead in fluid flow communication with an underground natural gas deposit in a geological formation; a single stage membrane separation system in fluid flow communication with the wellhead(s), the system comprising at least one polymeric membrane unit in which each membrane comprises a retentate side and a permeate side and has a $CO_2/CH_4$ selectivity of at least about 5; a combustion system in fluid flow communication with the permeate side of said membrane(s); and an energy recovery system in combination with the combustion system.

The single stage membrane separation system may be in fluid flow communication with a single natural gas wellhead, or a plurality of natural gas wellheads providing a combined feed to the single stage membrane separation system.

In all arrangements of the apparatus, the energy recovery system is a system that recovers at least a portion of the energy in the combustion exhaust gas generated by the combustion system. The energy is recovered in the form of power and/or heat.

The energy may be recovered using any suitable system although, in preferred embodiments, power is recovered using at least one turbine and heat is recovered using at least one heat transfer system in which a heat transfer fluid such as water or oil is heated by indirect heat exchange to form steam or hot oil respectively. Energy may be recovered from the steam as power using a steam turbine. In addition or alternatively, the heated heat transfer fluid may be used to heat other process fluids by indirect heat exchange.

In some preferred embodiments, a gas turbine is used as the combustion and energy recovery systems. The gas turbine may be a combined cycle gas turbine with a steam turbine to generate additional electric power. In other embodiments, the gas turbine may be combined with a once-through steam generator that generates electric power and process steam. In further embodiments, the gas turbine may be combined with a back-pressure steam turbine that generates electric power and process steam.

In other preferred embodiments, a boiler is used as the combustion and energy recovery systems to generate steam. Alternatively, an oil heater is used as the combustion and energy recovery systems to generate hot oil. In still further embodiments, a reciprocating engine is used as the combustion and energy recovery system.

The apparatus may further comprise one or more of the following:
a feed gas compressor system (e.g. a compressor) to compress the natural gas feed;
a feed gas expansion system (e.g. an expander or an expansion valve) to reduce the pressure of the natural gas feed;
a heat exchange system (e.g. a cooler or a heater) to adjust the temperature of the natural gas feed as appropriate by indirect heat exchange;
a phase separator system (e.g. a "knock out" pot) to remove condensate from the natural gas feed;
a dehydration system for removing water from the natural gas feed by absorption (e.g. using triethylene glycol) or by adsorption (e.g. using molecule sieves).

In a second arrangement of the second aspect, the apparatus comprises at least one compression system; a single stage membrane separation system comprising at least one polymeric membrane unit in which each membrane comprises a retentate side and a permeate side, and has a $CO_2/CH_4$ selectivity of at least about 5; a combustion system in fluid flow communication with the permeate side of the membrane(s); and an energy recovery system in combination with said combustion system, said energy recovery system comprising at least one turbine; wherein said compression system or, where there is more than one, at least one of said compression systems is driven by the turbine(s). In preferred embodiments, all of said compression systems are driven by the turbine(s).

The apparatus may comprise one or more compression systems selected from the group consisting of a feed gas compression system, a permeate gas compression system, and a refrigerant fluid compressions system. In this regard, the apparatus may comprises a first feed gas compression system for compressing the feed to the membrane separation system and/or a second feed gas compression system for compression the feed to a solvent absorption system.

At least one compression system may be driven directly by the turbine(s) using for example a drive shaft which is optionally geared as required. Alternatively, the turbine(s) drives an electricity generator system which in turn powers the compression system(s). At least some of the power required to drive the compression system(s) may be provided by a reciprocating engine, i.e. an internal combustion engine, either directly using an optionally geared drive shaft, or indirectly via an electricity generator system.

A third arrangement of the apparatus comprises a source of natural gas; and a carbon dioxide removal system in fluid flow communication with said source of natural gas. The carbon dioxide removal system comprises in parallel a solvent absorption system comprising a carbon dioxide absorption stage and a solvent re-generation stage; and a single stage membrane separation system comprising at least one polymeric membrane unit in which each membrane comprises a retentate side and a permeate side and has a $CO_2/CH_4$ selectivity of at least about 5. The apparatus further comprises a combustion system in fluid flow communication with the permeate side of the membrane(s); and an energy recovery system in combination with said combustion system, said energy recovery system comprising a heat transfer system integrated between the combustion system and the solvent re-generation stage of the solvent absorption system.

This aspect of the apparatus may be applied to any suitable source of natural gas such as a tank or other suitable storage vessel. However, the apparatus has particular application where the source is at least one wellhead.

The apparatus may also be applied to any suitable solvent absorption system, including systems involving physical and chemical absorption solvents. However, the apparatus has particular application where the solvent absorption system is an amine absorption system such as ADIP® (Shell Global Solutions, Inc.), or aMDEA® (BASF).

The heat transfer system may use any suitable heat transfer fluid such as steam or hot oil. In general, where the untreated natural gas comprises hydrogen sulfide at a concentration above the threshold of the specification for pipeline distribution, e.g. more than 4 ppmv, then the apparatus would typically further comprise a hydrogen sulfide removal system located either upstream of the single stage membrane separation system, or downstream of the membrane separation system on the retentate side.

Examples of suitable hydrogen sulfide removal systems would include SulFerox™ by Shell and FLEXSORB™ by Exxon. By systems involve absorption using hydrogen sulfide-selective absorbents.

The invention will now be described by way of example only with reference to the figures and the below mentioned examples.

FIG. 1 depicts a flowsheet for a two stage membrane separation system from the prior art.

A stream 1 of natural gas feed is introduced to a first membrane stage 100 at a high pressure, e.g. about 965 psi (66.5 bar). This membrane stage, and all other membrane stages described below, comprises one or more membrane separation units in series. Where there is more than one membrane separation unit in a given stage, the retentate gas from a first unit becomes the feed to the subsequent unit.

Carbon dioxide permeates preferentially through the membranes to provide a stream 2 of retentate gas having pipeline quality levels of carbon dioxide, e.g. less than 2%, with a relatively small pressure drop, e.g. of about 15 psi (1 bar). A stream 3 of permeate gas is removed from the first membrane stage 100 at low pressure, e.g. about 23 psi (1.6 bar). Since the permeate gas contains a significant fraction of methane, e.g. about 65%, methane is recovered from the gas. In this regard, stream 3 is fed to compressor 101 where it is compressed to a high pressure, e.g. 965 psi (66.5 bar), to form stream 4 which is then fed to a second membrane stage 102. In the second stage 102, a stream 5 of retentate gas is recycled to the feed to the first membrane stage 100 and a stream 6 of permeate gas is either vented or flared.

The overall methane recovery of the prior art process in FIG. 1 is typically greater than 99%.

The invention will now be described with reference to the embodiments illustrated in FIG. 2 to FIG. 7.

Figure 2:
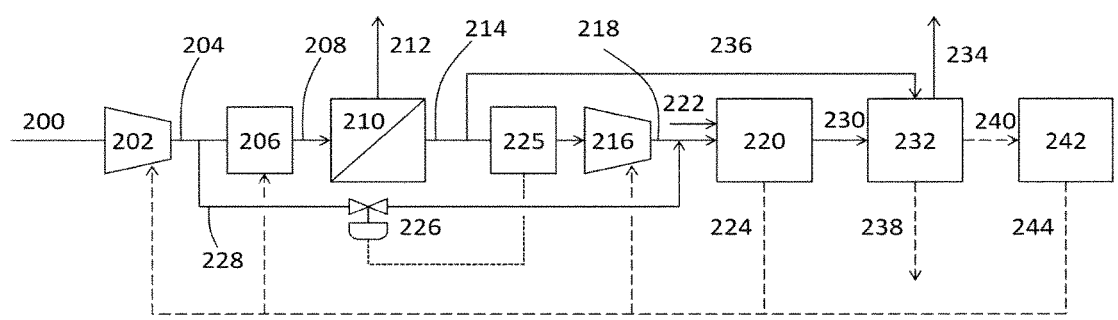
FIG. 2 depicts a flow sheet for an embodiment of the present invention in which the permeate gas is combusted to generate power (which is used to provide compression duty within the process) and heat.

In FIG. 2, a stream 200 of natural gas feed is introduced to a feed compressor 202 where it is compressed to produce a stream 204 of compressed natural gas at about 965 psi (66.5 bar). At least the majority of stream 204 is fed to a heat exchange system 206 where the natural gas is either cooled by indirect heat exchange (e.g. to improve membrane selectivity of carbon dioxide over methane) or warmed by indirect heat exchange (e.g. to prevent condensation from forming on the membrane surface) to produce a stream 208 of feed gas for the single stage membrane separation system 210. Options for heat exchange system 206 include a chilled water heat exchanger, a propane refrigeration unit, or a gas fired heater.

Stream 208 is fed to the single stage membrane separation system 210 to produce a stream 212 of retentate gas (e.g. treated or "sweetened" natural gas) that meets the specification for pipeline quality natural gas, and a stream 214 of permeate gas typically comprising at least 40% methane and having a higher heating value of at least 400 BTU/scf (15 MJ/Nm$^3$). Typically, membranes are sized for the worst case (i.e. to produce pipeline quality natural gas from feeds with the highest carbon dioxide fraction) of the range of possible feeds. At least a portion of stream 214 is fed to a permeate gas compressor 216 to produce a stream 218 of compressed permeate gas at about 300 psi (21 bar) which is then fed to a combustion system (e.g. a gas turbine or a reciprocating engine) 220 where it is combusted in air (stream 222) to produce power (indicated by dashed line 224) used to drive the feed compressor 202 and/or the permeate gas compressor 216.

For optimum performance, the feed to the combustion system 220 should have a constant heat content. However, variations in flow rate and/or composition of the natural gas can affect the heat content of the feed to the combustion system 220 and a bypass system is employed to address such variations and ensure efficient performance. In this regard, a sensor system 225 monitors the flow rate and composition of the feed stream 214. If a significant variation in the flow rate and/or composition of the feed is detected, then a signal (indicated by the line of shorter dashes) is sent to flow control valve 226 which controls the flow of a portion 228 of natural gas from stream 204 to the feed 218 to the combustion system 220, bypassing the membrane system 210 and normalizing the heat content of the feed to the combustion system 220.

The bypass system may also be required for startup.

Generally, the power required for the permeate gas compressor 216 is significantly less than that required for the interstage compressor 101 of the prior art indicated in FIG. 1 as the pressure required to feed a combustion system 220 is lower than that required to feed the second membrane stage 102 in FIG. 1.

In addition to power, the combustion system 220 generates a stream 230 of exhaust gas which is fed to a heat recovery steam generator (HRSG) 232 before being vented as stream 234, optionally after emissions treatment. The HRSG 232 may be duct fired with a portion 236 of permeate gas 214. Steam generated by the HRSG 232 can be used for process heat (indicated by dashed line 238) and/or to feed a steam turbine 242 (indicated by dashed line 240). In the steam turbine 242, additional power (indicated by dashed line 244) is generated to increase the overall efficiency of the system.

The power generated by the combustion system 220 (indicated by dashed line 224) and by the steam turbine (indicated by dashed line 244) can be used to power the feed compressor 202, the permeate gas compressor 216 and/or the power needs of heat exchange system 206, particularly if the heat exchange system 206 employs vapor-compression refrigeration with a working fluid such as propane.

The membrane stage 210 must be sized such that the heating value of stream 214 is sufficiently high to fuel the combustion system 220, whereas in the prior art the membranes are sized to minimize the methane in the permeate stream. The membrane stage 210 is typically smaller than the membrane stages that would be required for the prior art. The overall methane recovery in the present invention is typically less than 95%, and usually less than 92%.

Figure 3:
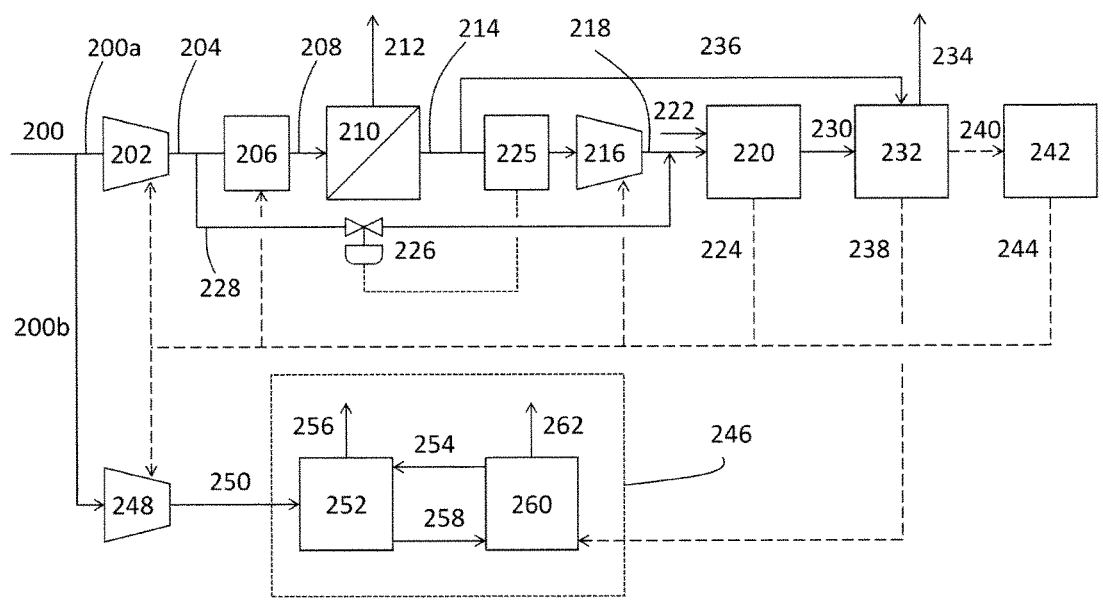
FIG. 3 depicts a flow sheet for a modification of the embodiment shown in FIG. 2 in which power and heat are exported to an integrated amine absorption process.

The flowsheet of FIG. 3 depicts the process of FIG. 2 integrated with a parallel amine solvent absorption system 246 for removing carbon dioxide from natural gas. The features of FIG. 3 that are common to FIG. 2 have been given the same reference numerals. The following is a discussion of the additional features.

In FIG. 3, the stream 200 of natural gas feed is divided with a first portion 200a being introduced to feed compressor 202 as in FIG. 2. A second portion 200b is introduced to a feed compressor 248 of the amine absorption system 246 to produce a stream 250 of compressed natural gas at about 180 psi (12 bar). Stream 250 is fed to an absorber 252 where it is contacted with a carbon dioxide-lean aqueous amine solution 254. Carbon dioxide is washed out of the natural gas and a stream 256 of treated natural gas meeting the specification for pipeline distribution is removed. A stream 258 of carbon dioxide-rich amine solution is removed from the absorber 252 and is fed to a stripper 260 within which the carbon dioxide is stripped from the amine solution to regenerate the carbon dioxide-lean solution 254. A stream 262 of carbon dioxide liberated from the solvent is then either vented to the atmosphere or flared.

The feed compressor 248 of the amine absorption system 246 may be powered using power generated by the combustion system 220 and/or the steam turbine 242. In addition, the substantial reboiler heating duty for stripper 260 may be supplied using steam 238 generated in the HRSG 232. In this way, the present invention is able not only to add capacity to the amine plant, but also to provide all utilities to the amine plant.

Figure 4:
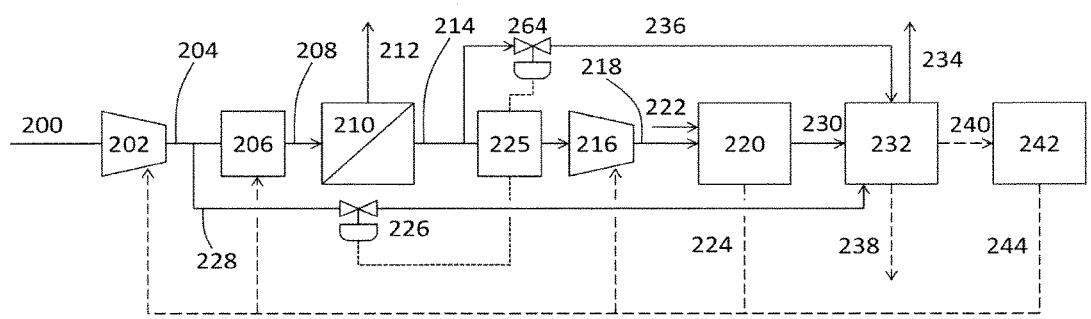
FIG. 4 depicts a flow sheet for another modification of the embodiment shown in FIG. 2.

The flowsheet of FIG. 4 depicts a modified version of the embodiment depicted in FIG. 2. The features of FIG. 4 that are common to FIG. 2 have been given the same reference numerals. The following is a discussion of the additional features.

In FIG. 4, the combustion system 220 is sized such that it requires less than the heat content of stream 218 at all times during the year. In this regard, a gas turbine requires less fuel and produces less power in the summer due to higher ambient temperatures. Gas composition and flow analysis in unit 225 controls flow control valve 264 to maintain the required heat content in the fuel 218 feeding combustion system 220. The extra fuel in stream 236 is diverted to duct firing in the HRSG 232 to generate additional steam 238. In order to meet the steam demands, the bypass stream 228 is used to supplement duct firing.

Figure 5:
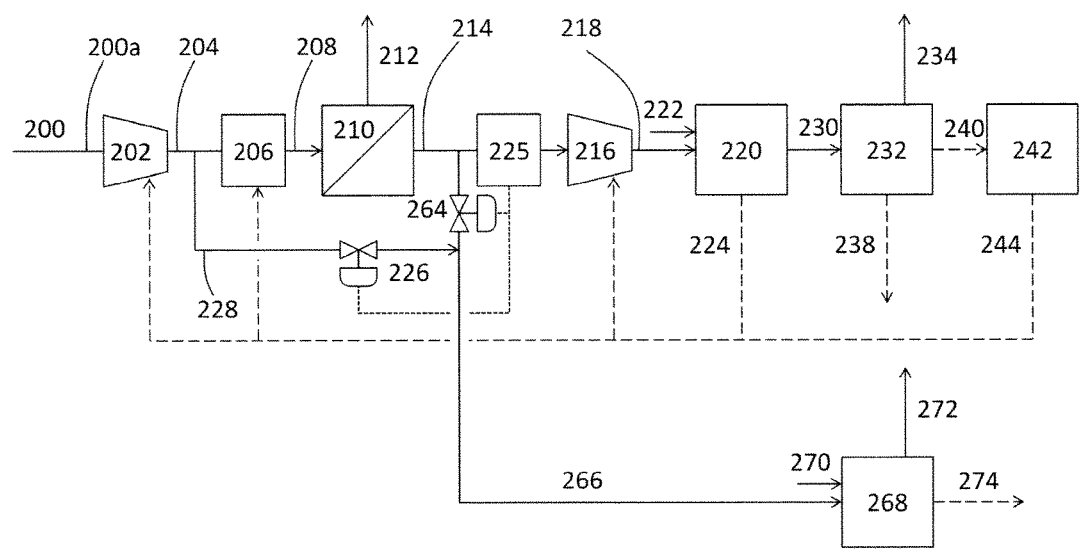
FIG. 5 depicts a flow sheet for a modification of the embodiment shown in FIG. 4 incorporating an auxiliary boiler.

The flowsheet of FIG. 5 depicts a modified version of the embodiment depicted in FIG. 4. The features of FIG. 5 that are common to FIG. 4 have been given the same reference numerals. The following is a discussion of the additional features.

In FIG. 5, gas composition and flow analysis in unit 225 controls flow control valve 264 to maintain the required heat content in the fuel 218 feeding combustion system 220. The extra fuel in stream 266 is diverted to an auxiliary boiler 268 for combustion with air 270 to produce a stream 272 of exhaust gas and to generate additional steam 274. In order to meet the steam demands, the bypass stream 228 is used as supplemental fuel in the auxiliary boiler 268. The steam could also be used in a Rankine cycle to generate more power.

Figure 6:
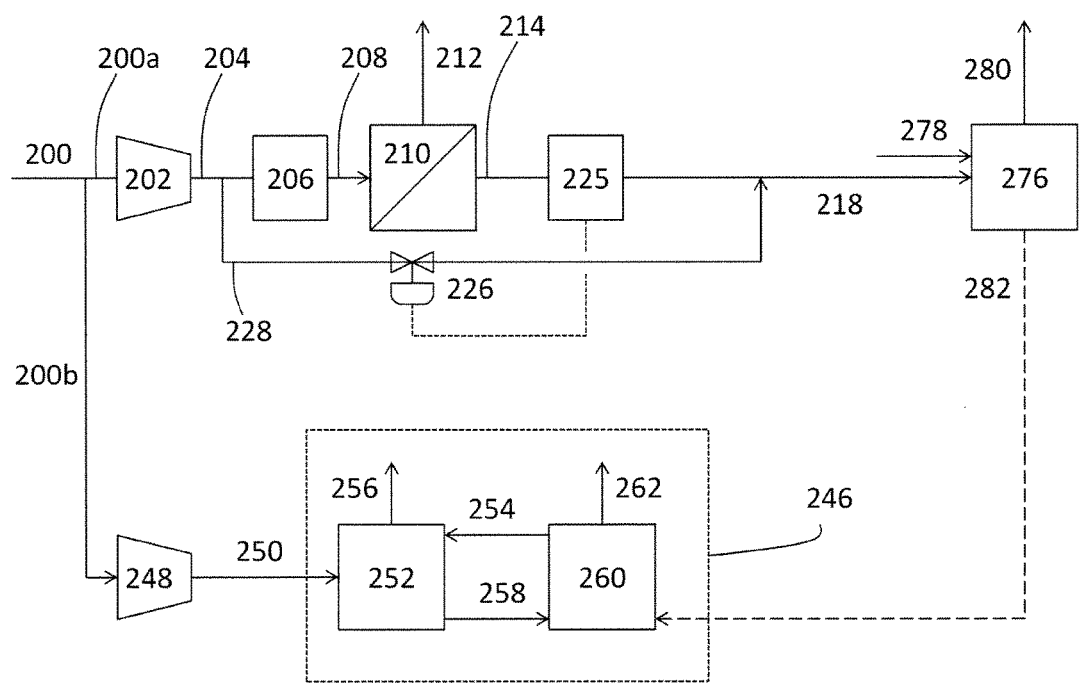
FIG. 6 depicts a flow sheet for another embodiment of the present invention in which the permeate gas is combusted to generate heat which is exported to an integrated amine absorption process.

The flowsheet of FIG. 6 depicts a modified version of the embodiment depicted in FIG. 3. The features of FIG. 6 that are common to FIG. 3 have been given the same reference numerals. The following is a discussion of the additional features.

The embodiment depicted in FIG. 6 eliminates the need for compression of the permeate gas prior to combustion. In this case, the stream 214 of permeate gas is not compressed and is instead fed directly to a boiler or heat transfer fluid, e.g. water or oil, heater 276 where it combusted in the presence of a stream 278 of air to produce a stream 280 of exhaust gas and to generate a stream 282 of heated heat transfer fluid, e.g. steam or hot oil. The exhaust 280 may require emissions treatment. This embodiment of the invention could be installed more quickly and with a smaller footprint, while still supplying process heat to the reboiler of 260.

Figure 7:
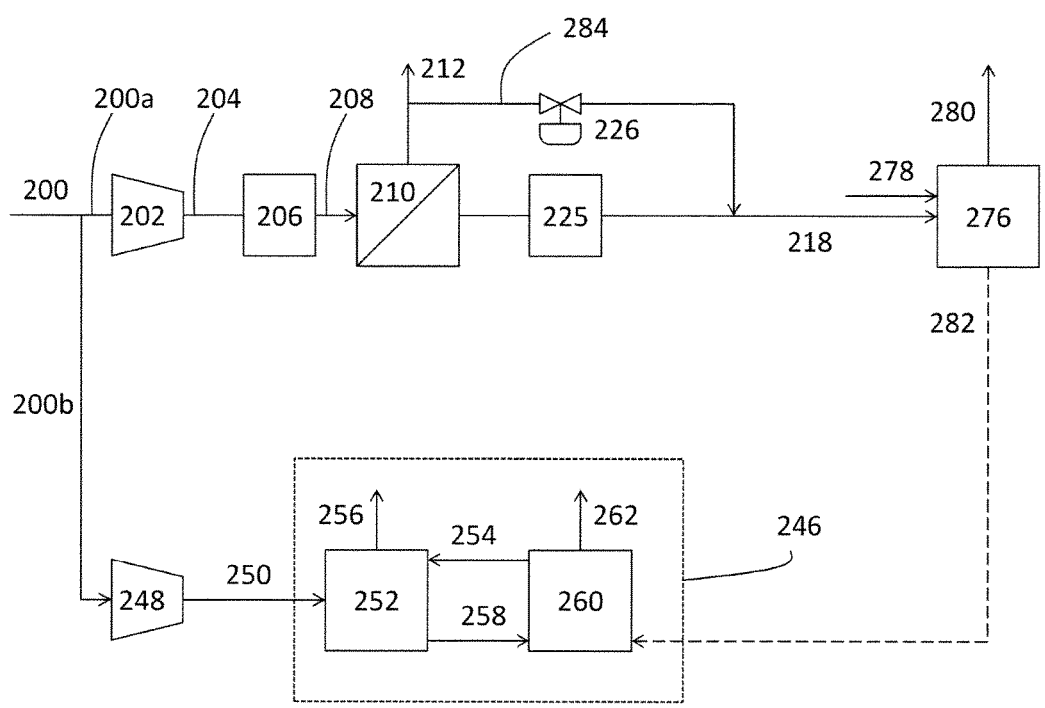
FIG. 7 depicts a flow sheet for a modification of the embodiments shown in FIG. 6 in which a portion of the retentate gas is used as a secondary fuel in the combustion.

The flowsheet of FIG. 7 depicts a modified version of the embodiment depicted in FIG. 6. The features of FIG. 7 that are common to FIG. 6 have been given the same reference numerals. The following is a discussion of the additional features.

In FIG. 7, unit 225 controls the flow control valve 226 to divert a portion 284 of the retentate gas from the single stage membrane separation system 210 for combustion in the boiler or hot oil heater 276.

In any of the embodiments illustrated, the fuel can be combusted with pure oxygen instead of air. In this case the exhaust would be largely carbon dioxide and water, which could be separated and the carbon dioxide used for enhanced oil recovery (EOR).

Aspects of the present invention include:

1. A process for separating carbon dioxide from natural gas, said process comprising:
introducing natural gas feed comprising carbon dioxide to a single stage membrane separation system for separation of carbon dioxide from said natural gas feed to produce methane-enriched retentate gas and carbon dioxide-enriched permeate gas comprising methane;
combusting at least a portion of said permeate gas to generate a combustion exhaust gas; and
recovering energy from said combustion.

2. A process according to #1, wherein said energy is recovered as power and/or heat.

3. A process according to #1 or #2, wherein said energy is recovered from at least a portion of said combustion exhaust gas.

4. A process according to any of #1 to #3, wherein said natural gas feed is taken from an underground deposit in a geological formation.

5. A process according to any of #1 to #4, wherein said natural gas feed has a higher heating value of at least about 780 BTU/scf (31 MJ/Nm$^3$)

6. A process according to any of #1 to #5, wherein said natural gas feed comprises at least about 1.5% carbon dioxide.

7. A process according to any of #1 to #6, wherein said natural gas feed comprises no more than about 15% carbon dioxide.

8. A process according to any of #1 to #7, wherein said natural gas feed comprises at least about 80% methane.

9. A process according to any of #1 to #8, wherein said natural gas feed comprises no more than about 97% methane.

10. A process according to any of #1 to #9, wherein said natural gas feed is introduced to said single stage membrane separation system at a pressure from about 275 psi (19 bar) to about 1200 psi (85 bar).

11. A process according to any of #1 to #10, wherein said natural gas feed is introduced to said single stage membrane separation system at a temperature from about 40° C. to about 80° C.

12. A process according to any of #1 to #11, wherein said natural gas feed is warmed by indirect heat exchange prior to being introduced to said single stage membrane separation system.

13. A process according to any of #1 to #11, wherein said natural gas feed is cooled by indirect heat exchange prior to being introduced to said single stage membrane separation system.

14. A process according to any of #1 to #13, wherein said permeate gas has a higher heating value of at least about 400 BTU/scf (15 MJ/Nm$^3$).

15. A process according to any of #1 to #14, wherein said permeate gas has a higher heating value of no more than about 800 BTU/scf (32 MJ/Nm$^3$).

16. A process according to any of #1 to #15, wherein said permeate gas comprises at least about 40% methane.

17. A process according to any of #1 to #16, wherein said permeate gas comprises no more than about 89% methane.

18. A process according to any of #1 to #17, wherein said permeate gas comprises at least about 10% carbon dioxide.

19. A process according to any of #1 to #18, wherein said permeate gas comprises no more than about 50% carbon dioxide.

20. A process according to any of #1 to #19, wherein said permeate gas is compressed prior to combustion.
21. A process according to any of #1 to #20, wherein energy is recovered as power from at least a portion of said combustion exhaust gas using at least one turbine generating a turbine exhaust gas.
22. A process according to #21, wherein said permeate gas is combusted using a gas turbine.
23. A process according to #21 or #22, wherein energy is recovered as heat from said turbine exhaust gas by indirect heat exchange with a heat transfer fluid.
24. A process according to any of #21 to #23, wherein said turbine exhaust gas is used to generate steam.
25. A process according to #24, wherein energy is recovered as power from said steam using a steam turbine.
26. A process according to any of #1 to #20, wherein energy is recovered as heat from at least a portion of said combustion exhaust gas by indirect heat exchange with a heat transfer fluid.
27. A process according to any of #1 to #20, wherein said permeate gas is combusted in a boiler to generate steam.
28. A process according to #27, wherein said permeate gas is combusted in a boiler to generate stream and energy is recovered as power from said steam using a steam turbine.
29. A process according to any of #1 to #20, wherein said permeate gas is combusted in an oil heater to generate hot oil.
30. A process according to any of #1 to #20, wherein said permeate gas is combusted in a reciprocating engine.
31. A process according to any of #1 to #30, wherein said permeate gas is the primary fuel for combustion.
32. A process according to any of #1 to 31, wherein said permeate gas is combusted together with a secondary fuel.
33. A process according to any of #1 to #32, wherein the higher heating value of said permeate gas being combusted is maintained at a substantially constant level.
34. A process according to #33, wherein secondary fuel is added to said permeate gas for combustion in order to maintain said higher heating value at said substantially constant level.
35. A process according to #34, wherein the amount of said secondary fuel added to said permeate gas varies in response to changes in flow rate and/or composition of said permeate gas for combustion.
36. A process according to any of #32 to #35, wherein said secondary fuel comprises methane.
37. A process according to any of #32 to #36, wherein said secondary fuel is selected from the group consisting of a portion of said natural gas feed and a portion of said retentate gas.
38. A process according to any of #1 to 37, wherein said combustion is oxyfuel combustion producing a flue gas for use in enhanced oil recovery (EOR).
39. A process according to any of #1 to #38, wherein energy is recovered as power, at least a portion of which is used to provide compression duty.
40. A process according to any of #1 to #39, wherein energy is recovered as power, at least a portion of which is used to drive at least one compression system selected from the group consisting of a feed gas compression system, a permeate gas compression system and a refrigerant fluid compression system.
41. A process according to any of #1 to #40, wherein energy is recovered as heat, at least a portion of which is used to provide utility heating duty.
42. A process according to any of #1 to #41, wherein energy is recovered as heat, at least a portion of which is used to provide at least a portion of the utility heating duty required by a solvent absorption plant.
43. A process according to #42, wherein said solvent absorption plant has a natural gas feed comprising carbon dioxide, and said natural gas feed for said single stage membrane separation system is taken from said natural gas feed to said solvent absorption plant.
44. A process according to #43, wherein energy is recovered as power, at least a portion of which is used to drive a feed compression system for said solvent absorption plant.
45. A process according to any of #1 to #44, wherein energy is recovered as heat, at least a portion of which is used to provide at least a portion of the utility heating duty required for pre-heating said natural gas feed to said single stage membrane separation system.
46. A process according to any of #1 to #45, wherein said single stage membrane separation system comprises from two to four polymeric membrane units in series.
47. A process according to any of #1 to #46, wherein said single stage membrane separation system comprises at least one polymeric membrane unit in which the membrane(s) has a $CO_2/CH_4$ selectivity of at least about 5.
48. A process according to any of #1 to 47, wherein said single stage membrane separation system comprises at least one polymeric membrane unit in which the membrane(s) have a $CO_2/CH_4$ selectivity of no more than about 100.
49. A process according to any of #1 to #48, wherein said single stage membrane separation system comprises at least one polymeric membrane unit comprising polyimide membranes.
50. A process according to any of #1 to #50, wherein overall methane recovery is no more than 95%.
51. A process for separating carbon dioxide from natural gas taken from an underground deposit in a geological formation, said natural gas comprising at least about 80% methane and from about 1.5% to about 15% carbon dioxide and having a higher heating value of at least about 780 BTU/scf (31 MJ/Nm$^3$), said process comprising:
introducing said natural gas feed to a single stage membrane separation system comprising at least one polymeric membrane unit in which the membrane(s) has a $CO_2/CH_4$ selectivity of from about 10 to about 50, said natural gas feed being introduced to said system at a pressure from about 275 psi (19 bar) to about 1200 psi (85 bar) and a temperature from about 40° C. to about 80° C. for separation of carbon dioxide from said natural gas feed to produce methane-enriched retentate gas for pipeline distribution and carbon dioxide-enriched permeate gas comprising at least about 40% methane and from about 10% to about 50% carbon dioxide and having a higher heating value from about 400 BTU/scf (15 MJ/Nm$^3$) to about 800 BTU/scf (32 MJ/Nm$^3$);
combusting at least a portion of said permeate gas to generate combustion exhaust gas; and
recovering energy from said combustion.
52. A process for separating carbon dioxide from natural gas, said process comprising:
introducing natural gas feed comprising carbon dioxide to a single stage membrane separation system for separation of carbon dioxide from said natural gas feed to produce methane-enriched retentate gas and carbon dioxide-enriched permeate gas comprising methane;
combusting at least a portion of said permeate gas to generate a combustion exhaust gas; and
recovering energy as power from said combustion,
wherein at least a portion of said power is used to provide compression duty.

53. A process for separating carbon dioxide from natural gas, said process comprising:
introducing natural gas feed comprising carbon dioxide to a solvent absorption system comprising a carbon dioxide absorption stage and a solvent re-generation stage, to produce carbon dioxide and carbon dioxide-depleted natural gas;
introducing natural gas feed comprising carbon dioxide to a single stage membrane separation system for separation of carbon dioxide from said natural gas feed to produce methane-enriched retentate gas and carbon dioxide-enriched permeate gas comprising methane;
combusting at least a portion of said permeate gas to generate a combustion exhaust gas; and
recovering energy as heat from said combustion,
wherein at least a portion of said heat recovered from said combustion is used to provide utility heating duty in said solvent regeneration stage of said solvent absorption system.

54. Apparatus for separating carbon dioxide from natural gas, said apparatus comprising:
at least one wellhead in fluid flow communication with an underground natural gas deposit in a geological formation;
a single stage membrane separation system in fluid flow communication with said wellhead(s), said system comprising at least one polymeric membrane unit in which each membrane comprises a retentate side and a permeate side and has a $CO_2/CH_4$ selectivity of at least about 5;
a combustion system in fluid flow communication with said permeate side of said membrane(s); and
an energy recovery system in combination with said combustion system.

55. Apparatus for separating carbon dioxide from natural gas, said apparatus comprising:
at least one compression system;
a single stage membrane separation system comprising at least one polymeric membrane unit in which each membrane comprises a retentate side and a permeate side, and has a $CO_2/CH_4$ selectivity of at least about 5;
a combustion system in fluid flow communication with said permeate side of said membrane(s); and
an energy recovery system in combination with said combustion system;
wherein said compression system or, where there is more than one, at least one of said compression systems is powered by said energy recovery system.

56. Apparatus according to #55, wherein said energy recovery system comprises at least one turbine.

57. Apparatus according to #56, wherein said turbine or, where there is more than one turbine, at least one of said turbines is coupled mechanically to said compression system.

58. Apparatus according to #56 or #57, wherein said turbine or, where there is more than one, at least one of said turbines is coupled mechanically to an electricity generator, said compression system comprising an electric motor and said generator being coupled electrically to said electric motor.

59. Apparatus according to any of #56 to #58, wherein said combustion system and energy recovery system is a gas turbine.

60. Apparatus according to #55, wherein said combustion system and energy recovery system comprises a reciprocating engine.

61. Apparatus according to #60, wherein said reciprocating engine is coupled mechanically to said compression system.

62. Apparatus according to #60 or #61, wherein said reciprocating engine is coupled mechanically to an electricity generator, said compression system comprising an electric motor and said generator being coupled electrically to said electric motor.

63. Apparatus according to any of #55 to #62, wherein said compression system(s) comprise at least one compression system selected from the group consisting of a feed gas compression system, a permeate gas compression system and a refrigerant fluid compression system.

64. Apparatus for separating carbon dioxide from natural gas, said apparatus comprising:
a source of natural gas feed;
a carbon dioxide removal system in fluid flow communication with said source of natural gas feed, said carbon dioxide removal system comprising in parallel;
a solvent absorption system comprising a carbon dioxide absorption stage and a solvent re-generation stage; and
a single stage membrane separation system comprising at least one polymeric membrane unit in which each membrane comprises a retentate side and a permeate side and has a $CO_2/CH_4$ selectivity of at least about 5;
a combustion system in fluid flow communication with said permeate side of said membrane(s); and
an energy recovery system in combination with said combustion system, said energy recovery system comprising a heat transfer system integrated between said combustion system and said solvent re-generation stage of said solvent absorption system.

65. Apparatus according to #64, wherein said solvent absorption system comprises a feed compression system and said energy recovery system comprises at least one turbine that drives said feed compression system of said solvent absorption system.

Example 1

The process depicted in FIG. 2 was modeled by computer using ASPEN™ Plus software (version 7.2; © Aspen Technology, Inc.) to demonstrate how the invention would work to purify a methane feed containing 6% carbon dioxide and generate 105 MW of electric power and 200 million BTU/h (59 MWth or megawatts thermal) of steam.

The membrane stage in these examples uses three membrane units in series, each with a selectivity for carbon dioxide over methane of 10.

No duct firing was used in this example.

The results of the simulation as provided in Table 1 below. The flow is provided in MMscf/day ($Nm^3/S$) and the pressure is provided in psi (bar).

TABLE 1

| Stream No. | 204 | 212 | 214 | 218 |
|---|---|---|---|---|
| $CH_4$ flow | 229 (71) | 208 (65) | 21 (6.5) | 21 (6.5) |
| $CO_2$ flow | 15 (4.7) | 4 (1.2) | 11 (3.4) | 11 (3.4) |
| Pressure | 965 (66.5) | 950 (65.5) | 23 (1.6) | 300 (21) |

Methane recovery in this case is 90.8%.

Example 2

The process depicted in FIG. 2 was modeled by computer using ASPEN™ Plus software (version 7.2; © Aspen Technology, Inc.) to demonstrate how the invention would work to purify a methane feed containing 6% carbon dioxide and generate 105 MW of electric power and 200 million BTU/h (59 MWth) of steam.

The membrane stage in these examples uses three membrane units in series, each with a selectivity for carbon dioxide over methane of 25.

No duct firing was used in this example.

The results of the simulation as provided in Table 2 below. The flow is provided in MMscf/day (Nm$^3$/s) and the pressure is provided in psi (bar).

TABLE 2

| Stream No. | 204 | 212 | 214 | 218 |
|---|---|---|---|---|
| CH$_4$ flow | 405 (126) | 384 (119) | 21 (6.5) | 21 (6.5) |
| CO$_2$ flow | 26 (8.1) | 7 (2.2) | 19 (5.9) | 19 (5.9) |
| Pressure | 965 (66.5) | 950 (65.5) | 23 (1.6) | 300 (21) |

Methane recovery in this case is 94.8%.

While the invention has been described with reference to the preferred embodiments depicted in the figures, it will be appreciated that various modifications are possible within the spirit or scope of the invention.

In this specification, unless expressly otherwise indicated, the word 'or' is used in the sense of an operator that returns a true value when either or both of the stated conditions are met, as opposed to the operator 'exclusive or' which requires only that one of the conditions is met. The word 'comprising' is used in the sense of Including' rather than to mean 'consisting of'. All prior teachings above are hereby incorporated herein by reference. No acknowledgment of any prior published document herein should be taken to be an admission or representation that the teaching thereof was common general knowledge in Australia or elsewhere at the date thereof.

Measurements, amounts and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described. Further, where multiple possible ranges are given for a single property, the minimum value from one range may be combined with the maximum value from another range. For example, concentration ranges of "from 3 to 10% or from 5 to 12%" should be interpreted to also include the ranges from 3 to 12% and from 5 to 10%. The foregoing interpretation guidelines should apply regardless of the breadth of the range or the characteristics being described.

Unless otherwise stated, any feature described herein can be combined with any aspect or any other feature described herein.

The invention claimed is:

1. A process for separating carbon dioxide from natural gas, said process comprising:
providing a natural gas feed comprising carbon dioxide;
introducing the natural gas feed to a single stage membrane separation system for separation of carbon dioxide from said natural gas feed to produce methane-enriched retentate gas and carbon dioxide-enriched permeate gas comprising methane;
monitoring the flow rate and composition of the permeate gas to determine the heat content of the permeate gas;
combining an auxiliary stream with at least a portion of the permeate gas to form a feed stream for a combustion system, wherein the heat content of the feed stream for the combustion system is normalized by controlling the flow of the auxiliary stream based on the monitored flow rate and composition;
combusting the feed stream for the combustion system in the combustion system to generate a combustion exhaust gas; and
recovering energy from said combustion;
wherein the single stage membrane separation system comprises a plurality of polymeric membrane units in series, and wherein the retentate from one polymeric membrane unit of the plurality of polymeric membrane units is fed to an adjacent downstream polymeric membrane unit of the plurality of polymeric membrane units without recompression;
wherein the auxiliary stream comprises a bypass stream withdrawn from and comprising a portion of the natural gas feed to the single stage membrane separation system.

2. The process according to claim 1, wherein said natural gas feed has a higher heating value of at least about 780 BTU/scf (31 MJ/Nm$^3$).

3. The process according to claim 1, wherein said natural gas feed comprises at least about 1.5% carbon dioxide.

4. The process according to claim 1, wherein said natural gas feed comprises no more than about 97% methane.

5. The process according to claim 1, wherein said natural gas feed is introduced to said single stage membrane separation system at a pressure from about 275 psi (19 bar) to about 1200 psi (85 bar).

6. The process according to claim 1, wherein said natural gas feed is introduced to said single stage membrane separation system at a temperature from about 40° C. to about 80° C.

7. The process according to claim 1, wherein said permeate gas has a higher heating value of at least about 400 BTU/scf (15 MJ/Nm$^3$).

8. The process according to claim 1, wherein said permeate gas is compressed prior to said combustion.

9. The process according to claim 1, wherein energy is recovered as power from at least a portion of said combustion exhaust gas using at least one turbine generating a turbine exhaust gas.

10. The process according to claim 1, wherein energy is recovered as heat from at least a portion of said combustion exhaust gas by indirect heat exchange with a heat transfer fluid.

11. The process according to claim 1, wherein said feed stream for the combustion system is combusted together with a secondary fuel.

12. The process according to claim 1, wherein energy is recovered as power, at least a portion of which is used to provide compression duty.

13. The process according to claim 1, wherein energy is recovered as heat, at least a portion of which is used to provide utility heating duty.

14. The process according to claim 1, wherein the plurality of polymeric membrane units in series comprise from two to four polymeric membrane units in series.

15. The process according to claim 1, wherein the plurality of polymeric membrane units in series comprise at least one polymeric membrane unit in which the membrane(s) has a $CO_2/CH_4$ selectivity of at least about 5.

16. The process according to claim 1, wherein the plurality of polymeric membrane units in series comprise at least one polymeric membrane unit in which the membrane(s) have a $CO_2/CH_4$ selectivity of no more than about 100.

17. The process according to claim 1, wherein the plurality of polymeric membrane units in series comprise at least one polymeric membrane unit comprising polyimide membranes.

18. The process according to claim 1, wherein overall methane recovery is no more than 95%.

\* \* \* \* \*